United States Patent

Wagner

[11] Patent Number: 5,562,263
[45] Date of Patent: Oct. 8, 1996

[54] DAMPER FOR AIRCRAFT HEATING SYSTEMS

[76] Inventor: Dane Wagner, P.O. Box 211291, Anchorage, Ak. 99521

[21] Appl. No.: 294,590

[22] Filed: Aug. 23, 1994

[51] Int. Cl.$^6$ ..................................... B64D 13/00
[52] U.S. Cl. .................. 244/118.5; 244/129.1; 454/76
[58] Field of Search .............. 244/118.5, 129.1, 244/1 R; 454/363, 76; 384/206, 207, 208; 251/214, 305

[56] References Cited

U.S. PATENT DOCUMENTS

| | | | |
|---|---|---|---|
| 2,591,221 | 4/1952 | Whiteley | 384/207 |
| 2,891,826 | 6/1959 | Josephson et al. | 384/207 |
| 3,979,104 | 9/1976 | LaCoste et al. | 251/214 |
| 4,022,424 | 5/1977 | Davis et al. | 251/214 |
| 4,042,283 | 8/1977 | Cain et al. | 384/207 |
| 4,406,441 | 9/1983 | Lukesch et al. | 251/214 |
| 5,348,272 | 9/1994 | Lukstas et al. | 251/214 |

*Primary Examiner*—Galen L. Barefoot
*Attorney, Agent, or Firm*—Michael J. Tavella

[57] ABSTRACT

An improvement in the heating system of the Dehavilland DHC-2 aircraft, which has a heating system for the cabin that uses warm exhaust to heat air for the cabin, is disclosed. A heat exchanger unit is built into the exhaust system. Heat is fed into the cabin by a flexible duct. The heat is controlled from the cabin by of a damper at the duct connection to the exhaust system. The damper is typically mounted in a small heat box at the rear end of the exhaust. The damper is made from a flat rectangular plate that has a small bar welded across the top. This bar acts as a pivot pin that moves the damper to the appropriate position. After several hours of use, the vibration and heat warp the damper and the box. To prevent damage to the heat box and damper, this design adds a set of bearings to the pivot pin. These bearings give lateral and transverse stability and act as miniature shock absorbers. Thus, heating systems using this bearing design can operate up to five times as long before repairs are needed.

7 Claims, 2 Drawing Sheets

DAMPER FOR AIRCRAFT HEATING SYSTEMS

This invention relates to dampers used in small aircraft heating systems and more particularly to dampers used in the heating systems of Dehavilland DHC-2.

BACKGROUND OF THE INVENTION

The Dehavilland DHC-2 is a common transport aircraft. This plane has a heating system for the cabin that uses the warm exhaust to heat air for the cabin. The heat exchanger unit is built into the exhaust system. Heat is fed into the cabin by a flexible duct. The heat is controlled from the cabin by a damper at the duct connection to the exhaust system. When heat is not needed, the damper is set to allow the warm air to vent to the atmosphere. When heat is needed, the damper is moved, by a cable, to permit the warm air to flow into the cabin. The damper is typically mounted in a small heat box at the rear end of the exhaust tailpipe. The damper is made from a flat rectangular plate type "321" stainless steel that has a small shaft sleeve welded across the top. This sleeve pivots on a shaft that moves the damper to the appropriate position. After continued use, the vibration and heat tend to warp the damper and the housing. Often the damper is so badly damaged that the heat box must be rebuilt or replaced. If the airplane is used frequently, this procedure can be required several times a year.

SUMMARY OF THE INVENTION

To prevent damage to the heat box and damper, the present invention adds a set of spherical bearings to the shaft. These bearings provide lateral and transverse stability and act as miniature shock absorbers. Thus, heating systems using this bearing design can operate up to five times as long before repairs are needed.

A method of installation and repair is also disclosed. Here, the steps needed to restore a damaged unit are set out. These steps include removing all the old parts from the heat box, installing a pair of bearing housings on the heat box, installing a pair of bearings within the housings, replacing the shaft and reinstalling the cable control arm. It is an object of this invention to produce an improved heat control system for the Dehavilland DHC-2.

It is another object of this invention to produce an improved heat control system for the Dehavilland DHC-2, that decreases aircraft downtime and increases reliability.

DETAILED DESCRIPTION OF THE INVENTION

Figure 1:
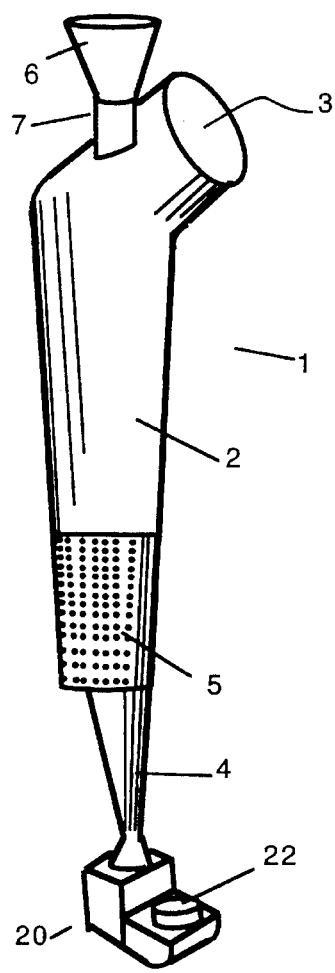
FIG. 1 is a side view of a typical tailpipe and intensifier tube portions of the exhaust system for the Dehavilland DHC-2, as prior art.
Figure 2:
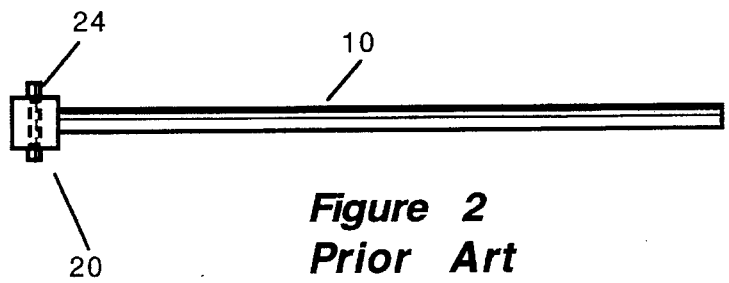
FIG. 2 is a side view of the intensifier heat exchanger tube found within the tailpipe of the Dehavilland DHC-2, as prior art.
Figure 3:
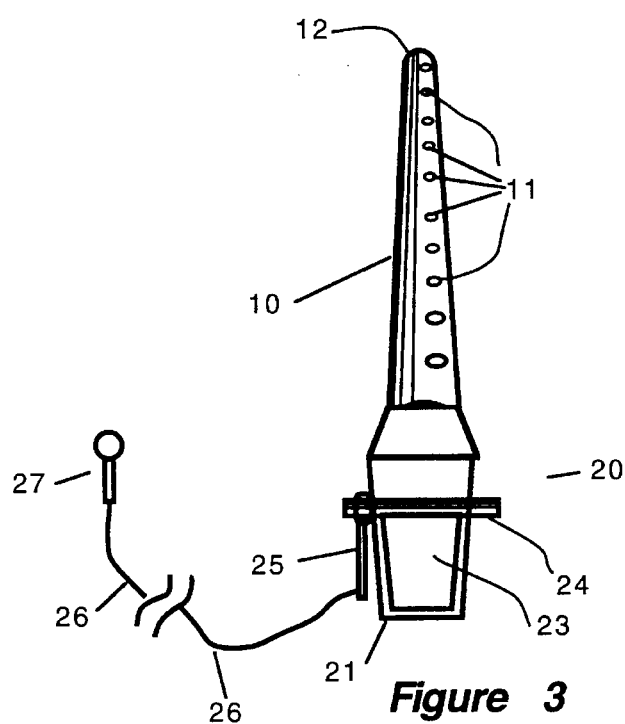
FIG. 3 is a front perspective view of the heat exchanger showing the damper box, as prior art.

Referring now to the drawings, and particularly to FIGS. 1, 2 and 3, the components of the tailpipe, intensifier tube and cabin heat exchanger portions of the exhaust system for a Dehavilland DHC-2 are shown. These components exist within the prior art. The exhaust system 1, shown in FIG. 1, has a metal housing 2. This housing 2 is bent as shown. The exhaust inlet 3 connects to the airplane engine's exhaust manifold. A plurality of louvers 5 is installed in the housing 2 to muffle the exhaust. A conically shaped section 4 is attached to the housing to funnel exhaust out of the muffler and away from the aircraft.

Cold air is forced into the exhaust housing 2 through a funnel 6 the funnel 6 attaches to the housing 3 through a formed nipple 7. A heat exchanger intensifier tube 10, that runs down the length of the housing, 2 connects to this formed nipple 7 inside housing 2. FIG. 2 shows the heat exchanger intensifier tube 10, removed from the housing 2. The heat exchanger intensifier tube 10 is a long cylindrical tube. It has several turbulator dents 11 that improve heat exchanger performance. The heat exchanger intensifier tube 10 is placed within the housing 2 so that its end 12 fits within the formed nipple 7. In the prior art, at the opposite end of the heat exchanger intensifier tube 10 is a damper box assembly 20. This assembly has a box 21, an outlet connector nipple 22, a damper plate 23, a rotating shaft 24 and a control handle 25. A control cable 26 attaches to the control handle 25 to operate the damper as discussed below.

During flight, if the pilot does not desire cabin heat, the damper is moved to the open position and the heated air in the heat exchanger tube 10 is vented to the atmosphere. If cabin heat is desired, a control is engaged in the cabin of the aircraft that forces the damper closed. In this position, the damper forces the warm air into the outlet connector nipple 22, which is connected to a flexible duct (not shown) that feeds the warm air into the cabin.

Although this system is simple, in operation it has a short life before the damper assembly must be repaired or replaced. Vibration and heat cause the damper shaft 24 to become loose over time, which often distorts and warps the box 21, making repair difficult. Often, the entire assembly 22 must be replaced. The main cause of these failures is that the shaft 24 is simply placed in holes drilled into the damper box 21 side. The shaft rests on nothing but simple bushing washers (not shown).

Figure 4:
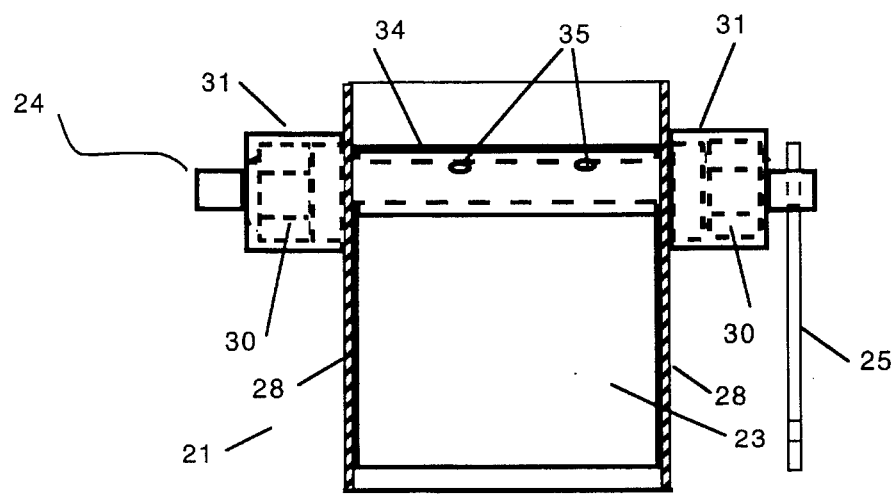
FIG. 4 is a detail front view of the modified damper plate.
Figure 5:
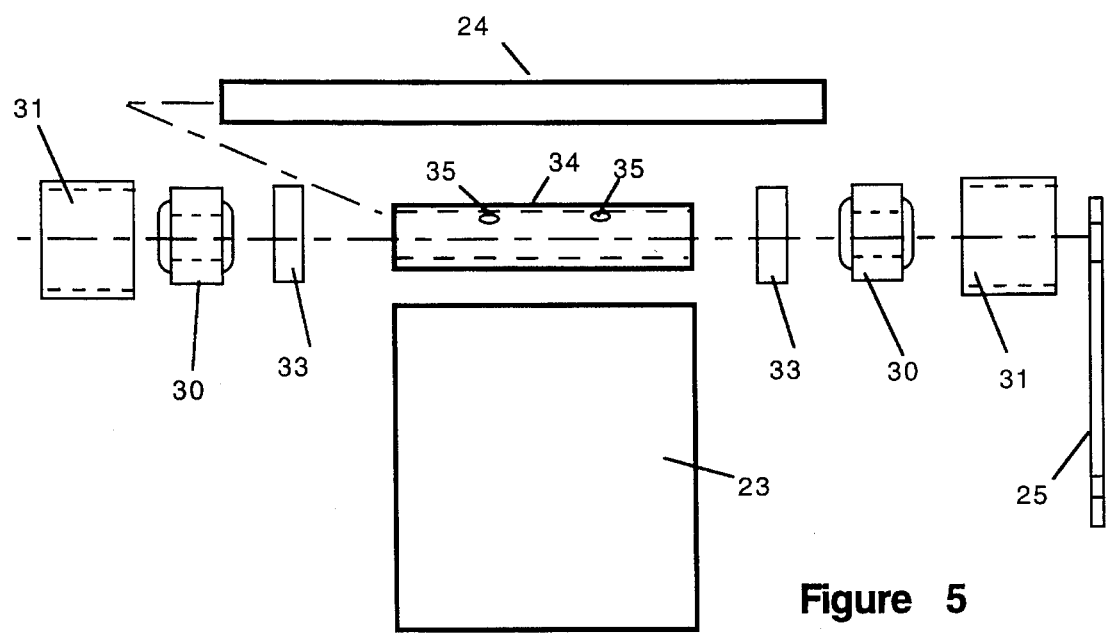
FIG. 5 is an exploded view of the modified damper plate.

Referring now to FIGS. 4 and 5, the present invention overcomes these problems. FIG. 4 shows the new damper box 21, fully assembled. FIG. 5 shows this assembly in an exploded view. The invention adds a stainless steel spherical bearing 30 and an outer stainless steel bearing housing 31 to each side of the box 21 for the bushing washers (not shown), to support rotating shaft 24. The assembly has a damper plate 23 that is attached to a shaft sleeve 34 as shown. The damper plate 24 is typically welded to the shaft sleeve 34. The bearings 30 are inserted into bearing housings 31. The spherical bearings 30 are spaced within the housings 31 using spacer washers 33. The bearings 30 are typically welded to the housings 31. In the preferred embodiment, the bearings are welded in three places around the housings 31. The preferred welding method for welding the spherical bearings to the bearing housings is the gas tungsten arc welding process.

The damper and shaft sleeve assembly are then aligned in the box 21. The shaft 24 is then placed through the box walls 28 and the damper-sleeve assembly. The shaft must protrude from both sides of the box 21 sufficiently to allow the bearing-bearing housing assemblies to be added. Moreover, one end of the shaft must extend sufficiently to ensure the cable control arm 25 can be installed properly. Once the shaft 24 is installed, the bearing-bearing housing assemblies can be placed over the shaft 24 as shown. The housings are then welded to the box 21 walls. The shaft 24 is then welded to the inner race of both bearings. The control arm 25 is then placed on the shaft 24 and aligned properly so that the cabin heat control lever 27 in the aircraft cabin operates the damper correctly. Once the control arm 25 is aligned, it is welded to the shaft 24 to ensure its alignment. Finally, when all the components are properly aligned, the shaft 24 is welded to the shaft sleeve 34 using the rosette holes 35 provided in the shaft sleeve 34. (See FIG. 5).

In the preferred embodiment, the bearings 30 are self-aligning. Use of the bearings 30 provides a smooth operating performance and limits travel of the shaft 24 within the box 21. Using spherical bearings 30 results in less wear, friction, and vibration. The bearings 30 provide smoother operation due to a more precise fit of the shaft 24, which results in longer life of the box assembly 20 because the warping caused by heat that destroys the original design is greatly reduced using the bearings 30. Besides, there is less wear on the cabin heat control cable 26 because of smoother damper operation.

The stainless steel bearings self align with distortion of the box 21. This allows the damper shaft to pivot freely. The bearings also dampen vibration and reduce harmonics. Finally, the use of bearings in this design eliminate mechanical play in the system, which is the main cause of system failure.

The method of repairing damaged boxes 20 is as follows. This method also can be used to build new boxes. The steps to perform for repair of the damper box assembly 20 are as follows: 1) blast the entire assembly 20 clean; 2) remove the old shaft 24, bushings and damper plate 23 from the box; 3) grind out any shaft remnants from the cable control handle 25; 4) insert spherical bearings 30 into the bearing housings 31, using an appropriate shim 33; 5) tack weld the bearings 30 to the bearing housings 31 in three equally spaced places around the circumference; 6) weld the shaft sleeve 34 to the damper plate 23; 7) place the assembled shaft sleeve 32 and damper plate 23 into the damper box 21; 8) slide a new shaft 24 into place; 9) install the bearings 30 and bearing housings 31 over the shaft, one on each end; 10) ensure that the shaft 24 has enough spacing to hold the cable control handle 25; 11) align the damper plate 23 and bearings housings 31 so that the damper plate 23 is centered within the box 21; 12) weld the bearing housings 31 to the box 21 at two places for each bearing housing 31; 13) weld the end of the shaft 24 opposite to the cable control handle 25 to the inner race of the bearing 30 at that end of the box 21; 14) position the cable control handle 25 on the shaft 24, measure for proper spacing and weld the cable control handle 25 to the shaft 24; 15) set the proper timing-i.e., set the control handle 25 position in proper position with respect to a cabin heat control lever 27 inside the aircraft; and 16) finally, weld the shaft sleeve 34 to the shaft 24 using the rosettes 35 provided, while maintaining the control arm position established in step 14 (note that no filler metal is required after the shaft 24 and sleeve 34 are welded together).

With the repairs made, the assembled heat exchanger intensifier tube 10 can be reinstalled in the housing 2. The entire assembly can then be installed on the aircraft, ready for use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A cabin heat delivery system for a Dehavilland DHC-2 comprising:
   a) a box, having a top, bottom and four sides;
   b) a rotating shaft, rotatably attached within said box and having two ends, each end protruding from said box in an opposite disposition;
   c) a pair of spherical bearings, each spherical bearing having an inner bearing race, said inner bearing races of said spherical bearings being welded to said rotating shaft
   d) means for supporting said pair of spherical bearings, fixedly attached to said box;
   e) a damper plate, fixedly attached to said rotating shaft and being disposed within said box;
   f) a control handle, fixedly attached to said rotating shaft; and
   g) means for activating said control handle from within an aircraft cabin.

2. The cabin heat delivery system of claim 1 wherein said pair of spherical bearings are self-aligning.

3. A cabin heat delivery system for a Dehavilland DHC-2 having a box, an outlet connector nipple, a damper plate, a rotating shaft and a control handle, wherein the improvement comprises: a pair of spherical bearings, having inner bearing races, said inner bearing races being welded to said rotating shaft.

4. The cabin heat delivery system of claim 3 wherein said pair of spherical bearings are self-aligning.

5. A method of repairing a damaged damper box of a Dehavilland DHC-2 having a damper box, a damper plate, a rotating shaft, a plurality of bushings, and a cable control arm, all forming a damper assembly, comprising the steps of:
   a) blasting the damper assembly clean;
   b) removing the existing rotating shaft, bushings, and damper plate from said damper box;
   c) grinding out any remnants of the rotating shaft from the cable control arm;
   d) inserting a pair of spherical bearings, each spherical bearing having an inner bearing race, into a pair of bearing housings, each bearing housing having a circumference;
   e) tack welding each spherical bearing to the bearing housing in which the spherical bearing has been inserted, thereby forming a spherical bearing-bearing housing assembly;
   f) attaching a damper plate to a shaft sleeve, forming an assembly;
   g) placing the shaft sleeve and damper assembly into the damper box;
   h) sliding a new shaft through said shaft sleeve and said damper box such that the new shaft extends outwardly from the damper box;
   i) installing a spherical bearing-bearing housing assembly over a first end of said new shaft;
   j) installing a spherical bearing-bearing housing assembly over a second end of said new shaft;
   k) ensuring that one end of said new shaft has enough spacing to hold the cable control arm;
   l) aligning the damper plate and bearings housing so that the damper plate is centered within the damper box;

m) welding the bearing housings to the box;
n) welding the end of the shaft opposite to the cable control arm to the inner race of the spherical bearing located thereat;
o) welding the shaft at the cable control arm end to the inner race of the spherical bearing located thereat;
p) positioning the cable control handle on the new shaft, measuring for proper spacing with respect to the damper box, and then welding said cable control handle to the new shaft;
q) aligning the cable control arm with respect to an internal cabin heat control lever; and
r) welding the shaft sleeve to the new shaft.

6. The method of claim 5 wherein the step of tack welding the spherical bearings to the bearing housings comprises tack welding the spherical bearings in three equally spaced places around the circumference of the bearing housings.

7. The method of claim 6 wherein the step of tack welding the spherical bearings to the bearing housings utilizes a gas tungsten arc welding process.

\* \* \* \* \*